United States Patent
O'Rear

(10) Patent No.: US 6,693,138 B2
(45) Date of Patent: *Feb. 17, 2004

(54) REDUCTION OF CARBON DIOXIDE EMISSIONS FROM FISCHER-TROPSCH GTL FACILITY BY AROMATICS PRODUCTION

(75) Inventor: Dennis J. O'Rear, Petaluma, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/118,053

(22) Filed: Apr. 9, 2002

(65) Prior Publication Data

US 2003/0191199 A1 Oct. 9, 2003

(51) Int. Cl.$^7$ .......................... C07C 27/00; C10G 35/00
(52) U.S. Cl. .......................... 518/700; 208/133; 208/141
(58) Field of Search .................. 518/700; 208/133, 208/141

(56) References Cited

U.S. PATENT DOCUMENTS

| | | |
|---|---|---|
| 5,620,670 A | 4/1997 | Benham et al. |
| 6,043,288 A | 3/2000 | DeGeorge et al. |
| 6,103,773 A | 8/2000 | Wittenbrink et al. |

FOREIGN PATENT DOCUMENTS

| | | |
|---|---|---|
| GB | 1006745 | 10/1965 |
| WO | 01/72674 A1 | 10/2001 |

OTHER PUBLICATIONS

U.S. Patent Application No. 10/118,029, Dennis J. O'Rear, *Reducing CO2 levels in CO2–rich Natural Gases Converted into Liquid Fuels*, Filed Apr. 9, 2002, attorney docket No. 005950–710.

United Kingdom Search Report dated Aug. 26, 2003.

*Primary Examiner*—J. Parsa
(74) *Attorney, Agent, or Firm*—Burns, Doane, Swecker & Mathis, L.L.P.

(57) ABSTRACT

Provided is a process for reducing $CO_2$ emissions generated by a Fischer-Tropsch GTL facility. The process includes introducing a synthesis gas into a Fischer-Tropsch reactor and performing a Fischer-Tropsch process to produce a Fischer-Tropsch product and $CO_2$. At least a portion of the $CO_2$ from the Fischer-Tropsch reactor is fed into at least one of a feed stream being fed to a synthesis gas formation reactor, producing the synthesis gas, or the synthesis gas being fed into the Fischer-Tropsch reactor. In addition, naphtha is obtained from the Fischer-Tropsch product and is fed into a naphtha reformer. Naphtha reforming is conducted, generating hydrogen by-product and $C_6$–$C_{10}$ product. At least a portion of the hydrogen by-product, generated during naphtha reforming, is fed into the feed stream, converting at least a portion of the $CO_2$ in the feed stream into additional CO. Finally, the additional CO is converted into hydrocarbons in the Fischer-Tropsch reactor.

17 Claims, 2 Drawing Sheets

REDUCTION OF CARBON DIOXIDE EMISSIONS FROM FISCHER-TROPSCH GTL FACILITY BY AROMATICS PRODUCTION

BACKGROUND OF THE INVENTION

1. Field of the Invention

The present invention is directed to the reduction of carbon dioxide emissions from Fischer-Tropsch GTL facilities.

2. Description of the Related Art

The conversion of remote natural gas assets into transportation fuels has become more desirable because of the need to exploit existing natural gas assets as a way to satisfy the increasing need for transportation fuels. Generally, the term "remote natural gas" refers to a natural gas asset that cannot be economically shipped to a commercial market by pipeline.

Conventionally, two approaches exist for converting remote natural gases into conventional transportation fuels and lubricants, including but not limited to, gasoline, diesel fuel, jet fuel, lube base stocks, and the like. The first approach comprises converting natural gas into synthesis gas by partial oxidation, followed by a Fischer-Tropsch process, and further refining resulting Fischer-Tropsch products. The second approach comprises converting natural gas into synthesis gas by partial oxidation, followed by methanol synthesis wherein the synthesized methanol is subsequently converted into highly aromatic gasoline by a Methanol To Gasoline (MTG) process. Both of these approaches use synthesis gas as an intermediate. Also, while other approaches exist for using natural gas in remote locations, such approaches do not produce conventional transportation fuels and lubricants, but instead produce other petroleum products including, but not limited to, liquified natural gas (LNG) and converted methanol.

The Fischer-Tropsch and MTG processes both have advantages and disadvantages. For instance, the Fischer-Tropsch process has the advantage of forming products that are highly paraffinic. Highly paraffinic products are desirable because they exhibit excellent combustion and lubricating properties. Unfortunately, a disadvantage of the Fischer-Tropsch process is that the Fischer-Tropsch process emits relatively large amounts of $CO_2$ during the conversion of natural gas assets into saleable products. An advantage of the MTG process is that the MTG process produces highly aromatic gasoline and LPG fractions (e.g., propane and butane). However, while highly aromatic gasoline produced by the MTG process is generally suitable for use in conventional gasoline engines, highly aromatic MTG gasoline may be prone to form durene and other polymethyl aromatics having high crystallization temperatures that form solids upon standing. In addition, the MTG process is more expensive than the Fischer-Tropsch process and the products produced by the MTG process cannot be used for lubricants, diesel engine fuels or jet turbine fuels.

Accordingly, in view of the above disadvantages of the Fischer-Tropsch and MTG processes, there is a need for a process that is capable of producing desirable Fischer-Tropsch petroleum products while significantly minimizing $CO_2$ emissions commonly generated during the production of such products.

Catalysts and conditions for performing Fischer-Tropsch reactions are well known to those of ordinary skill in the art, and are described, for example, in EP 0 921 184A1, the contents of which are hereby incorporated by reference in their entirety. A schematic of a conventional Fischer-Tropsch process is shown in FIG. 1. A feed stream 11 comprising $CH_4$, $O_2$ and $H_2O$ is introduced into a synthesis gas formation reactor 13. Although feed stream 11 is depicted as a single stream, it may be desirable to introduce the feed as multiple separate streams. In fact, because it is undesirable to mix $O_2$ and $CH_4$ before introduction to the synthesis gas formation reactor 13, it may be especially beneficial to introduce at least the $O_2$ and $CH_4$ in separate streams. A synthesis gas stream 14 comprising CO, $H_2$ and $CO_2$ is produced from the synthesis gas formation reactor 13 and introduced into a Fischer-Tropsch reactor 15. A Fischer-Tropsch process is conducted to produce a Fischer-Tropsch product stream 16 that is fed into a first separator 17. The first separator 17 separates the Fischer-Tropsch product stream into an unreacted gas stream 18, comprising CO, $H_2$ and $CO_2$, and a hydrocarbon products stream 22 comprising principally $C_5^+$ liquids with small amounts of dissolved $C_1$–$C_5$ gaseous products. The unreacted gas stream 18 can be recirculated in a stream 21 to be mixed with the synthesis gas 14 before entering the Fischer-Tropsch reactor 15. In addition, a portion of the unreacted gas stream 18 can be removed in an exit stream 19 where excess CO, $H_2$ and $CO_2$ are ignited by a flare or used as low-BTU fuel.

The generation of $CO_2$ emissions from Fischer-Tropsch processes can be understood by examining the stoichiometry of the reaction that occurs during a Fischer-Tropsch process. For example, during Fischer-Tropsch processing, synthesis gas (i.e., a mixture including carbon monoxide and hydrogen), is generated, typically from at least one of three basic reactions. Typical Fischer-Tropsch reaction products include paraffins and olefins, generally represented by the formula $nCH_2$. While this formula accurately defines mono-olefin products, it only approximately defines $C_5^+$ paraffin products. The value of n (i.e., the average carbon number of the product) is determined by reaction conditions including, but not limited to, temperature, pressure, space rate, catalyst type and synthesis gas composition. The desired net synthesis gas stoichiometry for a Fischer-Tropsch reaction is independent of the average carbon number (n) of the product and is about 2.0, as determined by the following reaction equation:

$$nCO + 2nH_2 \rightarrow nH_2O + nCH_2$$

where $nCH_2$ represents typical Fischer-Tropsch reaction products such as, for example, olefins and paraffins.

The three general reactions that produce synthesis gas from methane are as follows:

steam reforming of methane: $CH_4 + H_2O \rightarrow CO + 3H_2$; dry reforming, or reaction between $CO_2$ and methane: $CH_4 + CO_2 \rightarrow 2CO + 2H_2$; and partial oxidation using oxygen:

$$CH_4 + \tfrac{1}{2}O_2 \rightarrow CO + 2H_2.$$

Although the above general reactions are the basic reactions used to produce synthesis gas, the ratio of hydrogen to carbon monoxide produced by the above reactions is not always adequate for the desired Fischer-Tropsch conversion ratio of 2.0. (In the instant application, all ratios are molar ratios, unless otherwise noted.) For example, in the steam reforming reaction, the resulting ratio of hydrogen to carbon monoxide is 3.0, which is higher than the desired hydrogen to carbon monoxide ratio of 2.0 for a Fischer-Tropsch conversion. Similarly, in the dry reforming reaction, the resulting hydrogen to carbon monoxide ratio is 1.0, which is lower than the desired hydrogen to carbon monoxide ratio of 2.0 for a Fischer-Tropsch conversion. In addition to exhibiting a hydrogen to carbon monoxide ratio that is lower than the desired ratio for a Fischer-Tropsch conversion, the above dry reforming reaction also suffers from problems associated with rapid carbon deposition. Finally, because the above partial oxidation reaction provides a hydrogen to carbon monoxide ratio of 2.0, the partial oxidation reaction is the preferred reaction for Fischer-Tropsch conversions.

Generally, the proportion of carbon in methane that is converted to heavier hydrocarbon products in Fischer-Tropsch/GTL processes is estimated to be about 68%. Thus, the remaining 32% of the carbon is left to form significant amounts of $CO_2$. Although these estimated values were provided for a GTL facility using cryogenic air separation, an autothermal reformer, a slurry bed Fischer-Tropsch unit and a hydrocracker for converting heavy wax into saleable products, GTL facilities using alternative technologies would exhibit similar carbon conversion efficiencies and $CO_2$ emissions. A detailed description of the above estimates is described in "$CO_2$ Abatement in GTL Plant: Fischer-Tropsch Synthesis," Report #PH3/15, November 2000, published by IEA Greenhouse Gas R&D Programme, which is incorporated herein by reference in its entirety, In commercial practice, an amount of steam added to a partial oxidation reformer can control carbon formation. Likewise, certain amounts of $CO_2$ can be tolerated in the feed. Thus, even though partial oxidation is the preferred reaction for Fischer-Tropsch conversions, all of the above reactions can occur, to some extent, in an oxidation reformer. It is also important to provide a low sulfur gas feedstock for the partial oxidation reformer. Typically this can be done by use of an adsorption or absorption process or combination thereof. Suitable adsorbents include, for example, water, amines, caustic compounds, combinations thereof and the like. Suitable adsorbents include, for example, ZnO, Cu, Ni, combinations thereof and the like. ZnO is a preferred adsorbent because it selectively removes sulfur species without substantially removing $CO_2$.

During partial oxidation, carbon dioxide forms because the reaction is not perfectly selective. That is, some amount of the methane in the reaction will react with oxygen to form $CO_2$ by complete combustion. The reaction of methane with oxygen to form $CO_2$ is generally represented by the following reactions:

$$CH_4 + O_2 \rightarrow CO_2 + 2H_2$$

and $$CH_4 + 2O_2 \rightarrow CO_2 + 2H_2O.$$

Furthermore, steam added to the reformer to control coking, or steam produced during the Fischer-Tropsch reaction can react with CO to form $CO_2$ in a water gas shift reaction represented by the following general reaction:

$$CO + H_2O \rightarrow CO_2 + H_2.$$

Thus, invariably a significant amount of $CO_2$ is formed during the conversion of methane into transportation fuels and lubricants by the Fischer-Tropsch process. The $CO_2$ produced during the Fischer-Tropsch process exits the Fischer-Tropsch/GTL process in a tail gas exiting the Fischer-Tropsch unit. Tail gases exiting a Fischer-Tropsch/GTL process comprise any gases that remain unconsumed by the Fischer-Tropsch process.

The above equations represent general stoichiometric equations; they do not reflect an optimum synthesis gas composition for the kinetics or selectivity of a Fischer-Tropsch reaction. Moreover, depending on the nature of the Fischer-Tropsch catalyst, synthesis gas ratios other than 2.0, typically less than 2.0, are used to prepare the feed to a Fischer-Tropsch unit. However, because Fischer-Tropsch units typically produce products exhibiting a hydrogen to carbon monoxide ratio of about 2.0, the limiting reagent, typically $H_2$, is consumed first. The extra reagent, typically CO, is then recycled back to the Fischer-Tropsch unit for further conversion. Synthesis gas compositions having hydrogen to carbon monoxide ratios other than 2.0 are typically generated by recycling unused reagents.

In view of the above discussion, there is an urgent need for a process that can produce desirable Fischer-Tropsch/GTL process products while minimizing the $CO_2$ emissions generally associated with Fischer-Tropsch/GTL processing.

SUMMARY OF THE INVENTION

The present invention satisfies the above objectives by providing a process that not only reduces $CO_2$ emissions, but also produces desired Fischer-Tropsch/GTL petroleum products.

The process of the present invention reduces $CO_2$ emissions by converting at least a portion of the $CO_2$ emitted by a Fischer-Tropsch process into additional CO that can be converted into hydrocarbons. More specifically, the process of the present invention reduces $CO_2$ emissions by reacting hydrogen by-product, generated from Fischer-Tropsch naphtha reforming, with $CO_2$ in a feed stream in a reverse water gas shift reaction to convert the $CO_2$ into additional CO that can be converted into hydrocarbons. Thus, one important advantage of the present invention is that it can produce desirable Fischer-Tropsch/GTL petroleum products and can economically reduce $CO_2$ emissions produced during the production of such products without having to employ costly $CO_2$ reduction measures.

In particular, a process, according to the present invention, for reducing $CO_2$ emissions from a Fischer-Tropsch facility includes introducing a synthesis gas into a Fischer-Tropsch reactor and performing a Fischer-Tropsch process on the synthesis gas to obtain a Fischer-Tropsch product and $CO_2$. At least a portion of the $CO_2$ is fed from the Fischer-Tropsch reactor to at least one of a feed stream being fed into a synthesis gas formation reactor or the synthesis gas being fed into the Fischer-Tropsch reactor. The process further comprises obtaining a naphtha from the Fischer-Tropsch product and introducing the naphtha into a naphtha reformer. The naphtha is then reformed producing hydrogen by-product and $C_6$–$C_{10}$ product. At least a portion of the hydrogen by-product is then fed into the feed stream fed into the synthesis gas formation reactor, converting at least a portion of the $CO_2$ in the feed stream into additional CO, by a reverse water gas shift reaction. Finally, the additional CO is converted into hydrocarbons in the Fischer-Tropsch reactor.

In accordance with another aspect of the invention, a process for reducing $CO_2$ emissions from a Fischer-Tropsch GTL facility includes introducing a synthesis gas comprising CO, $H_2$ and $CO_2$ into a Fischer-Tropsch reactor. Next, a Fischer-Tropsch process is performed on the synthesis gas to produce a Fischer-Tropsch product. The Fischer-Tropsch product is then separated into unreacted CO, $H_2$ and $CO_2$, a $C_1$–$C_5$ product having a hydrogen to carbon ratio of about 2.0, a naphtha and a $C_{10}^+$ product having a hydrogen to carbon ratio of about 2.0. The unreacted CO, $H_2$ and $CO_2$ is then recirculated into at least one of a feed stream being fed into a synthesis gas formation reactor that produces the synthesis gas or the synthesis gas being fed into the Fischer-Tropsch reactor. The naphtha is then reformed to generate hydrogen by-product and $C_6$–$C_{10}$ product with a hydrogen to carbon ratio of less than about 2.0. The hydrogen by-product is then mixed with the feed stream so that at least a portion of any $CO_2$ emitted from the Fischer-Tropsch reactor and recirculated into the feed stream, or any $CO_2$ otherwise present in the feed stream is converted into additional CO by a reverse water gas shift reaction. Finally, the additional CO is converted into hydrocarbons in the Fischer-Tropsch reactor.

According to yet another aspect of the invention, a process for reducing $CO_2$ emissions from a Fischer-Tropsch GTL process includes introducing a synthesis gas comprising CO, $H_2$ and $CO_2$, into a Fischer-Tropsch reactor. Next, a Fischer-Tropsch process is conducted on the synthesis gas to obtain a Fischer-Tropsch product. The Fischer-Tropsch product is then introduced into a first separator wherein the product is separated into unreacted CO, $H_2$ and $CO_2$, and hydrocarbon products. At least a portion of the unreacted CO, $H_2$ and $CO_2$ is then directed back into at least one of a feed stream being fed into a synthesis gas formation reactor, that produces the synthesis gas or the synthesis gas being fed into the Fischer-Tropsch reactor. At least a portion of the hydrocarbon products, separated from the Fischer-Tropsch product, are then directed into a second separator. In the second separator, the hydrocarbon products are separated into $C_1$–$C_5$ product having a hydrogen to carbon ratio of at least about 2.0 and a $C_{10}^+$ product having a hydrogen to carbon ratio of about 2.0. In addition, a naphtha is separated from the hydrocarbon products in the second separator. At least a portion of the naphtha is fed into a naphtha reformer. Hydrogen by-product is generated by reforming the naphtha in the naphtha reformer to produce $C_6$–$C_{10}$ product having a hydrogen to carbon ratio of less than about 2.0. At least a portion of the hydrogen by-product, generated during naphtha reforming, is mixed with the feed stream so that at least a portion of the $CO_2$ emitted by the Fischer-Tropsch process, or otherwise present in the feedstream, is converted into additional CO by a reverse water gas shift reacton fueled by the hydrogen by-product. Finally, the additional CO is converted into hydrocarbons in the Fischer-Tropsch reactor.

DETAILED DESCRIPTION OF THE PREFERRED EMBODIMENTS

Figure 1:
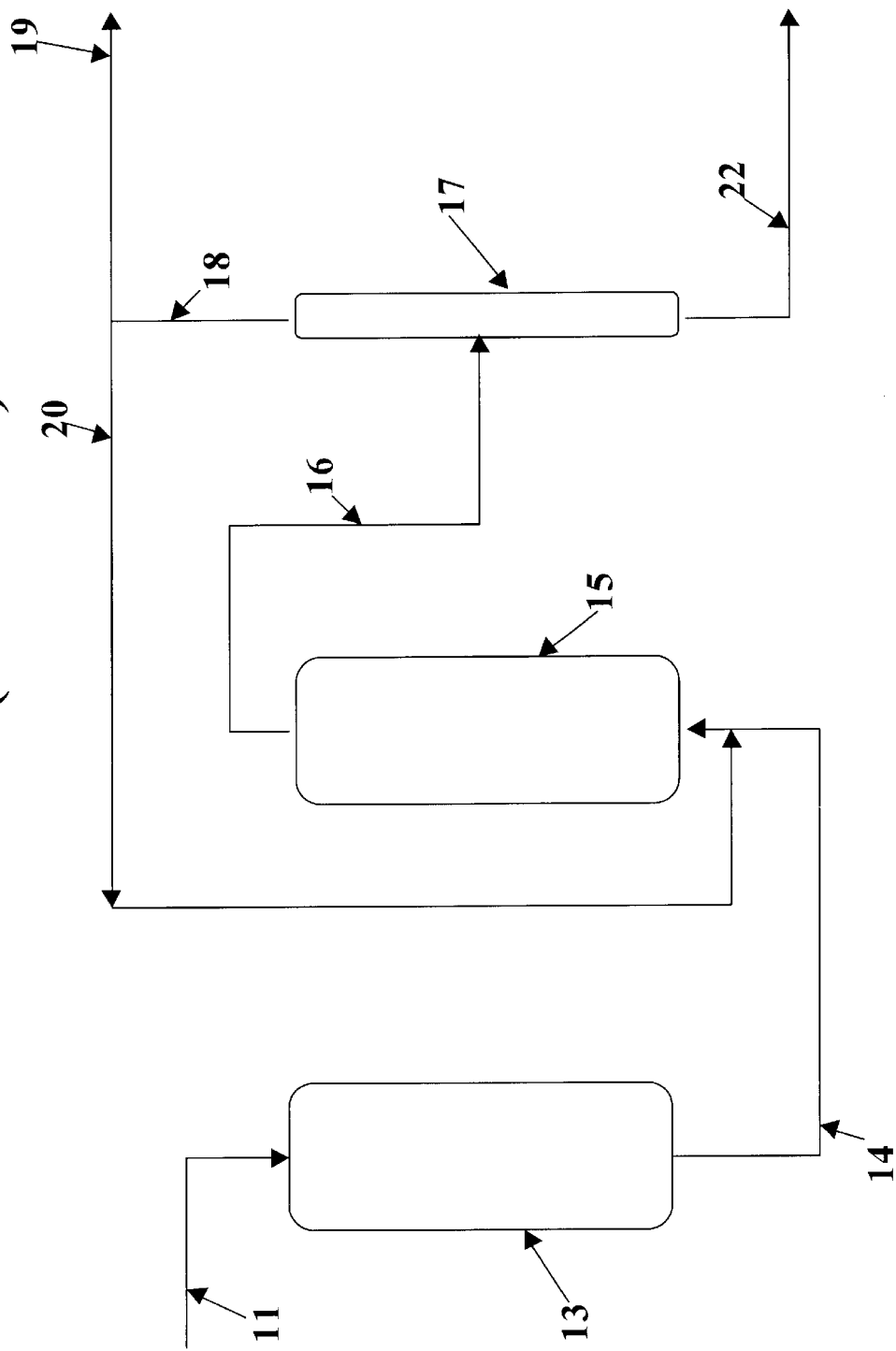
FIG. 1 is a schematic view of a conventional Fischer-Tropsch process.

In the present invention at least a portion of $CO_2$ emitted from a Fischer-Tropsch process is converted into additional CO that can be converted into hydrocarbons. The conversion of $CO_2$ into additional CO requires an additional hydrogen source so that a reverse water gas shift reaction can occur. A suitable reverse water gas shift reaction is represented by the following general reaction:

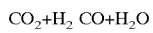

The hydrogen for the above water gas shift reaction is generated by converting at least a portion of a $C_5^+$ Fischer-Tropsch product into aromatics to form hydrogen by-product. A typical $C_8$ paraffin reaction that demonstrates how hydrogen by-product can be generated by converting a Fischer-Tropsch product into aromatics is as follows:

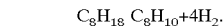

Processes for converting paraffin-rich streams into aromatics are well known in the field. Commonly, such conversion processes are referred to as "naphtha reforming processes," and are divided into two classes. The first class of naphtha reforming processes are referred to as conventional reforming processes that use a catalyst comprising at least one of platinum, alumina, a halogen (typically chlorine), rhenium, iridium, mixtures thereof and the like. The catalyst in conventional reforming processes is typically exposed to sulfur before being employed in the reaction. Those of ordinary skill in the art commonly expose conventional reforming catalysts to sulfur prior to use in the reaction in order to obtain highly selective conversion of $C_8$ to $C_{10}$ paraffins into aromatics. The second class of naphtha reforming processes are referred to as "non-acidic zeolitic reforming processes," such as, for example, AROMAXO® reforming processes. Non-acidic zeolitic reforming processes use a catalyst comprising at least one of platinum, a non-acidic zeolite (typically an L-type zeolite), potassium, barium, mixtures thereof and the like. Generally, non-acidic zeolitic catalysts are not exposed to sulfur prior to operation. In addition, non-acidic zeolitic catalysts are highly selective for the conversion of hexane and heptane in aromatics.

The present invention can employ either or both of the above naphtha reforming processes. Aromatic-rich products, having low hydrogen to carbon ratios, such as, for example, less than about 2.0, produced by the above reforming processes can be used in various applications. Suitable applications for such aromatic products include, but are not limited to, high octane blend components for gasoline, benzene for use as a chemical, especially for the production of cyclohexane, ethylbenzene and/or cumene, toluene for use as a chemical and xylene for use as chemicals, especially for the production of paraxylene.

The removal of hydrogen from Fischer-Tropsch products causes the net $C_5^+$ product to exhibit a lower hydrogen to carbon stoichiometric ratio. That is, even though the initial hydrogen to carbon ratio of the free synthesis gas is about 2.0, after conversion of a portion of the Fischer-Tropsch product into aromatics, the hydrogen to carbon stoichiometric ratio of the $C_5^+$ product declines to a value less than about 2.0, preferably less than about 1.95, and most preferably below about 1.90. Further, the $C_6$–$C_{10}$ stream generally contains a lower amount of hydrogen than heavier product streams. This is advantageous because it is most preferable to make aromatics from a $C_6$–$C_{10}$ portion of the product. Preferably, the $C_6$–$C_{10}$ portion of the $C_5^+$ hydrocarbon product will exhibit a lower hydrogen to carbon ratio than the hydrogen to carbon ratio of the $C_{10}^+$ portion. In embodiments, the $C_6$–$C_{10}$ portion of the $C_5^+$ product will exhibit a hydrogen to carbon ratio that is preferably about 0.1 unit less, more preferably about 0.2 unit less, and most preferably about 0.25 unit less than the hydrogen to carbon ratio of the $C_{10}^+$ portion of the product.

The hydrogen to carbon stoichiometric ratio of the resulting products can be determined by any number of methods including, but not limited to, chemical analysis such as Carlo-Erba combustion, Orsat chemical analysis, gas chromatography for identifying individual species, simple gas density, and NMR spectroscopy, combinations thereof and the like. Generally, simple chemical analysis is preferred in order to minimize cost and to provide an accurate analysis.

At least a portion of the hydrogen from the formation of aromatics is used to react with at least a portion of the $CO_2$ which is formed in the GTL process. The portion of $CO_2$ reacted with the by-product hydrogen can be from either the synthesis gas formation step, or the Fischer-Tropsch step, but preferably is from the Fischer-Tropsch step. The $CO_2$-rich stream can either be an uncondensed effluent from the Fischer-Tropsch process or, alternatively, a high $CO_2$ concentration stream can be obtained by extracting $CO_2$ from the $CO_2$-rich stream. The separation of $CO_2$ from other gases is well known in the industry and can be accomplished using any adsorbent or absorbent conventionally used to selectively separate $CO_2$. Most commonly, basic liquid amines are used to separate $CO_2$ from other gases but aqueous solutions of alkali metals with little or no amines can be used when the use of amines is undesirable.

It is also important to provide a low sulfur gas feedstock for the syngas formation process. Typically this can be done by use of an adsorption or absorption process or combination thereof. Suitable adsorbents include, for example, water, amines, caustic compounds, combinations thereof and the like. Suitable adsorbents include, for example, ZnO, Cu, Ni, combinations thereof and the like. ZnO is a preferred adsorbent because it selectively removes sulfur species without substantially removing $CO_2$.

The $CO_2$ generated by the Fischer-Tropsch process, or otherwise present in the feed stream, can be converted into additional CO, that can in turn be converted into hydrocarbons, by reacting the $CO_2$ with hydrogen by-product at least one of before, during or after the feed stream is introduced into the synthesis gas formation reactor. In embodiments, the $CO_2$ can either be reacted with hydrogen by-product in a separate reactor before entering the synthesis gas formation reactor, or can be accomplished by feeding both the hydrogen by-product and the feed stream into the synthesis gas reactor. The latter is more preferable because it is less costly than reacting in a separate reactor.

Hydrogen produced in the naphtha reforming process often contains significant amounts of C2+ hydrocarbons. These can cause coking in the methane reforming reactor, so it is preferable to process the hydrogen from the naphtha reforming reactor in a pre-reformer ahead of the main naphtha reformer. Likewise if there are significant $C_2$+ hydrocarbons in the methane feed to the reformer, it too should be processed in the pre-reformer. The purpose of the pre-reformer is to convert $C_2$+ hydrocarbons into syngas, methane, and water and to thereby avoid the coking that would otherwise occur. A typical pre-reforming process is disclosed, for example, in U.S. Pat. No. 6,114,400, the entire disclosure of which is incorporated herein by reference for all purposes.

Staged steam-methane reforming processes utilizing a pre-reformer typically includes an adiabatic pre-reforming reactor containing a highly active nickel catalyst, to reform heavier hydrocarbons in the feedstock (and a portion of the methane, if present) to yield a mixture of methane, hydrogen, carbon monoxide, carbon dioxide, and steam. This pre-reforming product is then further processed in a reformer to produce a raw synthesis gas product.

Another type of staged reformer process utilizes a gas heated reformer (GHR) followed by an autothermal reformer. The GHR is a type of heat exchange reformer in which the hot raw synthesis gas from the autothermal reformer furnishes the heat for the first reforming stage in the GHR.

The product streams in the present invention are Fischer-Tropsch-derived products generally in the ranges of $C_1$–$C_5$, naphtha and $C_{10}$+, wherein each of the general ranges may comprise more than one product stream. For example, each product stream can be a mixture, such as a synthetic crude, or may be individual streams such as LPG ($C_3$'s and $C_4$'s) condensates ($C_5$'s and $C_6$'s), high octane blend components ($C_6$–$C_{10}$ aromatic containing streams), jet fuel, diesel fuel, other distillate fuels, and lube blend stocks or lube blend stock feedstocks. Desired stoichiometric ratios specified in the present invention refer to the net product analysis. The $C_6$–$C_{10}$ naphtha product may be further described as "aromatic containing" meaning that the aromatic content is at least about 2 wt. %, preferably at least about 10 wt. % and most preferably at least about 25 wt. %, with analysis being done by GC or GC-MS.

In addition, the hydrogen by-product generated during naphtha reforming can also be used for other processes, such as hydrotreating a portion of the $C_5^+$ product to remove olefins, oxygenates and other trace heteroatoms.

Also, although recovered hydrogen from synthesis gases has been used for purposes including hydrotreating and catalyst regeneration, as described, for example, in U.S. Pat. Nos. 6,043,288 and 6,103,773, until now, no one has recovered hydrogen generated during naphtha reforming for the purpose of reducing Fischer-Tropsch process $CO_2$ emissions.

Additionally, while it is preferable to use hydrogen generated during naphtha reforming, it may be desirable to provide hydrogen from alternative sources. Thus, in a separate embodiment of the invention, the hydrogen generated during naphtha reforming is supplemented with hydrogen from alternative sources.

Figure 2:
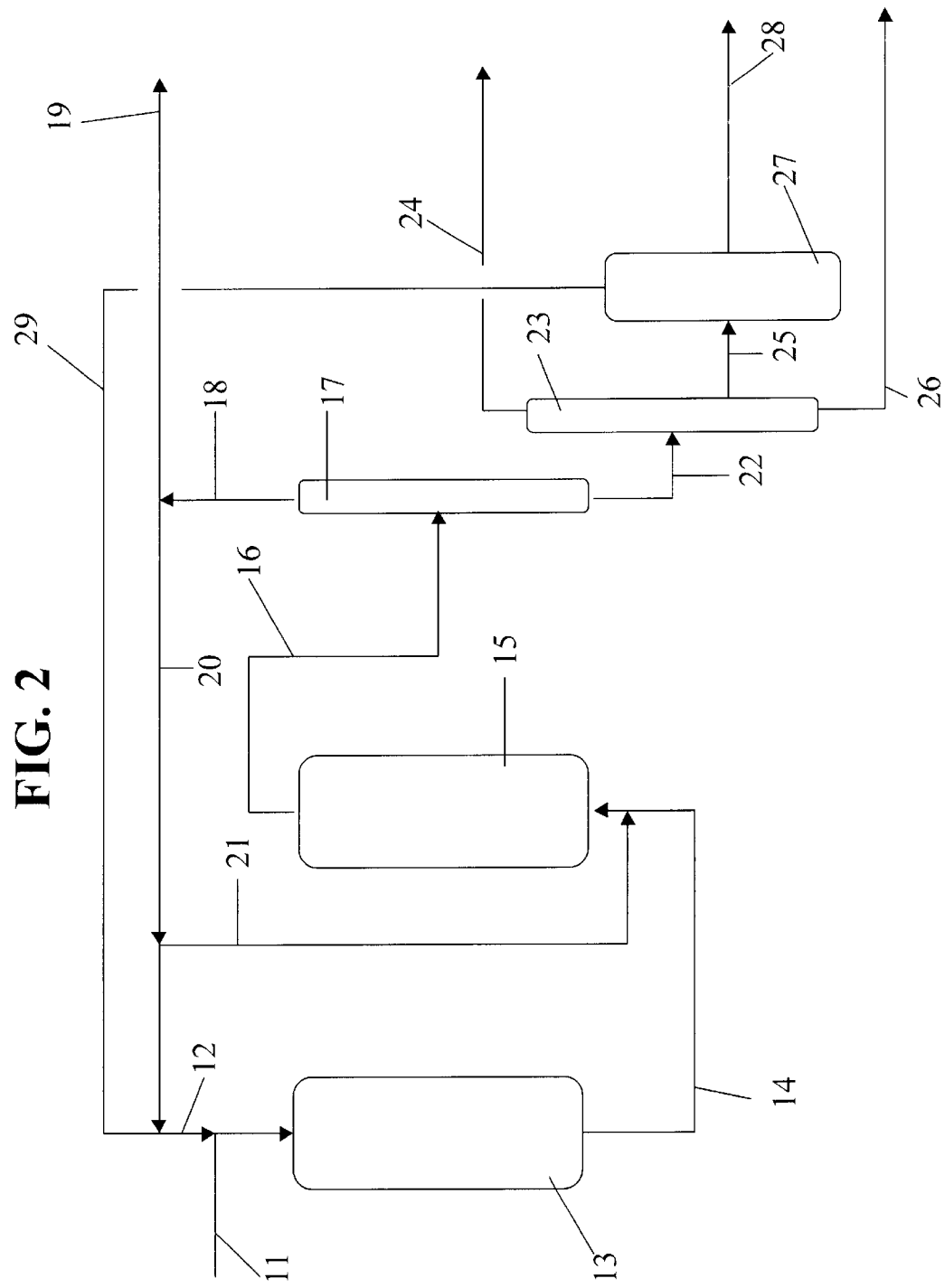
FIG. 2 is a schematic view of a preferred embodiment of a Fischer-Tropsch process according to the present invention.

A preferred embodiment of the present invention is depicted in FIG. 2. In this embodiment, a feed stream 11 comprising $CH_4$, $CO_2$, $O_2$ and $H_2O$ is introduced into a synthesis gas formation reactor 13. Reactor 13 contains a pre-reforming section to convert $C_2$+ hydrocarbons. The sulfur content of the feeds are controlled to less than about 1 ppm by use of conventional adsorption or absorption processes, a combination thereof or the like. Although feed stream 11 is depicted as a single stream, it may be desirable to introduce the feed as multiple separate streams. In fact, because it is undesirable to mix $O_2$ and $CH_4$ before introduction to the synthesis gas formation reactor 13, it may be especially beneficial to introduce at least the $O_2$ and $CH_4$ in separate streams. A synthesis gas stream 14 comprising CO, $H_2$ and $CO_2$ is produced from the synthesis gas formation reactor 13 and introduced into a Fischer-Tropsch reactor 15. A Fischer-Tropsch process is conducted to produce a Fischer-Tropsch product stream 16 that is fed into a first separator 17.

The first separator 17 separates the Fischer-Tropsch product stream into an unreacted gas stream 18, comprising CO, $H_2$ and $CO_2$, and a hydrocarbon products stream 22 comprising principally $C_5^+$ liquids with small amounts of dissolved $C_1$–$C_5$ gaseous products. The unreacted gas stream 18 can be recirculated in a stream 20 to be mixed with the feed stream 11 or can be recirculated in a stream 21 to be mixed with the synthesis gas 14 before entering the Fischer-Tropsch reactor 15. In addition, a portion of the unreacted gas stream 18 can be removed in an exit stream 19 where excess CO, $H_2$ and $CO_2$ are ignited by a flare or used as low-BTU fuel. The hydrocarbon products stream 22 enters a second separator 23.

The second separator 23 separates the hydrocarbon products stream 22 into a $C_1$–$C_5$ product stream 24, wherein the $C_1$–$C_5$ product has a hydrogen to carbon ratio of at least about 2.0, a naphtha stream 25 and a $C_{10}^+$ product stream 26, wherein the $C_{10}^+$ product has a hydrogen to carbon ratio near about 2.0. Water produced in the Fischer Tropsch reaction is also removed in this separation stage. The naphtha stream 25 enters a naphtha reformer 27.

The naphtha reformer 27 reforms the naphtha stream 25 generating a $C_6$–$C_{10}$ product stream 28, wherein the $C_6$–$C_{10}$ product has a hydrogen to carbon ratio of less than about 2.0, and a hydrogen by-product stream 29. The hydrogen by-product stream 29 recirculates and mixes with the feed stream 11, and optionally the unreacted gas stream 20. The hydrogen by-product reacts with the $CO_2$ present in the feed stream 11 and the unreacted gas stream 20 in a reverse water gas shift reaction, thereby converting at least a portion of the $CO_2$ generated by the Fischer-Tropsch process, or otherwise present in the feed stream 11, into additional CO that can be converted into hydrocarbons. The addition of $H_2$ to the feed to the syngas formation reactor permits greater quantities of $CO_2$ to be recycled to the reactor 13 and less to be ignited by flare or used as a low-BTU fuel, thus reducing $CO_2$ emissions.

While the present invention has been described with reference to specific embodiments, this application is intended to cover those various changes and substitutions that may be made by those of ordinary skill in the art without departing from the spirit and scope of the appended claims.

What is claimed is:

1. A process for reducing $CO_2$ emissions from a Fischer-Tropsch facility, the process comprising:
   a) introducing a synthesis gas into a Fischer-Tropsch reactor;
   b) performing a Fischer-Tropsch process on the synthesis gas to obtain a Fischer-Tropsch product and $CO_2$;
   c) feeding at least a portion of the $CO_2$ from the Fischer-Tropsch reactor into at least one of a feed stream being fed into a synthesis gas formation reactor that produces the synthesis gas or the synthesis gas being fed into the Fischer-Tropsch reactor;
   d) obtaining a naphtha from the Fischer-Tropsch product;
   e) introducing the naphtha into a naphtha reformer;
   f) reforming the naphtha in the naphtha reformer, producing hydrogen by-product and $C_6$–$C_{10}$ product;
   g) feeding at least a portion of the hydrogen by-product, generated during naphtha reforming, into the feed stream fed into the synthesis gas formation reactor, converting at least a portion of the $CO_2$ in the feed stream into additional CO, by a reverse water gas shift reaction; and
   h) converting the additional CO into hydrocarbons in the Fischer-Tropsch reactor.

2. The process of claim 1, further comprising separating the Fischer-Tropsch product into unreacted $CO_2$, $H_2$ and $CO_2$, and hydrocarbon products.

3. The process of claim 2, further comprising separating the hydrocarbon products into $C_1$–$C_5$ product having a hydrogen to carbon ratio of at least about 2.0, naphtha and $C_{10}^+$ product, the $C_{10}^+$ product having a hydrogen to carbon ratio of about 2.0.

4. The process of claim 1, wherein the $C_6$–$C_{10}$ product of step f) has a stoichiometric hydrogen to carbon ratio of less than about 2.0.

5. The process of claim 1, wherein the $C_6$–$C_{10}$ product of step f) has a stoichiometric hydrogen to carbon ratio of less than about 1.95.

6. The process claim 1, wherein the $C_6$–$C_{10}$ product of step f) has a stoichiometric hydrogen to carbon ratio of less than about 1.90.

7. The process of claim 3, wherein the $C_6$–$C_{10}$ product of step f) has a stoichiometric hydrogen to carbon ratio that is less than the $C_{10}^+$ product.

8. The process of claim 3, wherein the $C_6$–$C_{10}$ product of step f) has stoichiometric hydrogen to carbon ratio that is about 0.1 unit less than the $C_{10}^+$ product.

9. The process of claim 3, wherein the $C_6$–$C_{10}$ product of step f) has a stoichiometric hydrogen to carbon ratio that is about 0.25 unit less than the $C_{10}^+$ product.

10. A process for reducing $CO_2$ emissions from a Fischer-Tropsch GTL facility, the process comprising:
    a) introducing a synthesis gas comprising CO, $H_2$ and $CO_2$, into a Fischer-Tropsch reactor;
    b) performing a Fischer-Tropsch process on the synthesis gas to produce a Fischer-Tropsch product;
    c) separating the Fischer-Tropsch product into unreacted CO, $H_2$ and $CO_2$, a $C_1$–$C_5$ product having a hydrogen to carbon ratio of at least about 2.0, a naphtha, and a $C_{10}^+$ product having a hydrogen to carbon ratio of about 2.0;
    d) recirculating the unreacted CO, $H_2$ and $CO_2$ into at least one of a feed stream being fed into a synthesis gas formation reactor that produces the synthesis gas or the synthesis gas being fed into the Fischer-Tropsch reactor;
    e) reforming the naphtha to generate hydrogen by-product and $C_6$–$C_{10}$ product with a hydrogen to carbon ratio of less than about 2.0; and
    f) mixing the hydrogen by-product with the feed stream so that at least a portion of any $CO_2$ emitted from the Fischer-Tropsch reactor and recirculated into the feed stream, or any $CO_2$ otherwise present in the feed stream, is converted into additional CO by a reverse water gas shift reaction; and
    g) converting the additional CO into hydrocarbons in the Fischer-Tropsch reactor.

11. The process of claim 10, further comprising separating the Fischer-Tropsch product using two separators, a first separator to separate the Fischer-Tropsch product into unreacted CO, $H_2$ and $CO_2$ and hydrocarbon products, and a second separator for separating the hydrocarbon products into the $C_1$–$C_5$ product, the naphtha and the $C_{10}^+$ product.

12. The process of claim 10, wherein the $C_6$–$C_{10}$ product of step e) has a hydrogen to carbon ratio of less than about 1.95.

13. The process of claim 10, wherein the $C_6$–$C_{10}$ product of step e) has a hydrogen to carbon ratio of less than about 1.90.

14. The process of claim 11, wherein the $C_6$–$C_{10}$ product of step e) has a hydrogen to carbon ratio that is less than a hydrogen to carbon ratio of the $C_{10}^+$ product.

15. The process of claim 11, wherein the $C_6$–$C_{10}$ product of step e) has a hydrogen to carbon ratio that is about 0.1 unit less than a hydrogen to carbon ratio of the $C_{10}^+$ product.

16. The process of claim 11, wherein the $C_6$–$C_{10}$ product of step e) has a hydrogen to carbon ratio that is about 0.25 unit less than a hydrogen to carbon ratio of the $C_{10}^+$ product.

17. A process for reducing $CO_2$ emissions from a Fischer-Tropsch GTL process, the process comprising:
    a) introducing a synthesis gas comprising CO, H and $CO_2$, into a Fischer-Tropsch reactor;
    b) conducting a Fischer-Tropsch process on the synthesis gas to obtain a Fischer-Tropsch product;
    c) introducing the Fischer-Tropsch product into a first separator and separating the Fischer-Tropsch product into unreacted CO, $H_2$ and $CO_2$, and hydrocarbon products comprising $C_5^+$ liquids;

d) directing at least a portion of the unreacted CO, $H_2$ and $CO_2$ separated from the Fischer-Tropsch product back into at least one of a feed stream being fed into a synthesis gas formation reactor, that produces the synthesis gas or the synthesis gas being fed into the Fischer-Tropsch reactor;

e) directing at least a portion of the hydrocarbon products separated from the Fischer-Tropsch product into a second separator;

f) in the second separator, separating $C_1$–$C_5$ product having a hydrogen to carbon ratio of at least about 2.0 and separating $C_{10}^+$ product having a hydrogen to carbon ratio of about 2.0 from the hydrocarbon products fed into the second separator;

g) in the second separator, separating naphtha from the hydrocarbon products fed into the second separator;

h) feeding at least a portion of the naphtha into a naphtha reformer;

i) generating hydrogen by-product by reforming the naphtha in the naphtha reformer to produce $C_6$–$C_{10}$ product having a hydrogen to carbon ratio of less than about 2.0;

j) recirculating at least a portion of the hydrogen by-product, generated during naphtha reforming, to mix with the feed stream so that at least a portion of the $CO_2$ emitted by the Fischer-Tropsch process, or otherwise present in the feed stream, is converted into additional CO by a reverse water gas shift reaction fueled by the hydrogen by-product; and k) converting the additional CO into hydrocarbons in the Fischer-Tropsch reactor.

* * * * *

UNITED STATES PATENT AND TRADEMARK OFFICE
CERTIFICATE OF CORRECTION

PATENT NO. : 6,693,138 B2
DATED : February 17, 2004
INVENTOR(S) : Dennis J. O'Rear It is certified that error appears in the above-identified patent and that said Letters Patent is hereby corrected as shown below:

Column 9,
Line 52, please delete "$CO_2$" and insert in place therefor -- CO --.

Column 10,
Line 61, please delete "H" and insert in place therefor -- $H_2$ --.

Signed and Sealed this

Sixth Day of July, 2004

JON W. DUDAS
*Acting Director of the United States Patent and Trademark Office*